US012742943B2

(12) United States Patent
Burch et al.

(10) Patent No.: US 12,742,943 B2
(45) Date of Patent: Sep. 22, 2026

(54) QUAD WHEEL BUFFERING TUBE CLENCHER CAPSTAN

(71) Applicant: COMMSCOPE TECHNOLOGIES LLC, Hickory, NC (US)

(72) Inventors: Shawn Lee Burch, Taylorsville, NC (US); Jerry Clyde Moose, Catawba, NC (US); Antony David Shacklady, Hickory, NC (US); Phillip Anthony Cash, Cherryville, NC (US); Benjamin Clinton Burgess, Jr., Newton, NC (US); Paul Melton Godwin, Locust, NC (US); Keith Douglas Earhart, Waxhaw, NC (US); Travis John Card, Mooresville, NC (US); Michael Van Do, Denver, NC (US)

(73) Assignee: Technical Development Corporation, Concord, NC (US)

( * ) Notice: Subject to any disclaimer, the term of this patent is extended or adjusted under 35 U.S.C. 154(b) by 329 days.

(21) Appl. No.: 18/692,306

(22) PCT Filed: Sep. 13, 2022

(86) PCT No.: PCT/US2022/043371
§ 371 (c)(1),
(2) Date: Mar. 14, 2024

(87) PCT Pub. No.: WO2023/043739
PCT Pub. Date: Mar. 23, 2023

(65) Prior Publication Data

US 2025/0231366 A1 Jul. 17, 2025

Related U.S. Application Data

(60) Provisional application No. 63/360,228, filed on Sep. 14, 2021, provisional application No. 63/304,757, filed on Jan. 31, 2022.

(51) Int. Cl.
*G02B 6/44* (2006.01)

(52) U.S. Cl.
CPC ......... *G02B 6/4484* (2013.01); *G02B 6/4486* (2013.01)

(58) Field of Classification Search
CPC ....... G02B 6/4484; G02B 6/4486; G02B 6/44
See application file for complete search history.

(56) References Cited

U.S. PATENT DOCUMENTS 8,406,590 B2 * 3/2013 Casals .................. G02B 6/4484 385/100
8,489,219 B1 * 7/2013 Strong ................. G02B 6/4484 700/109

(Continued)

*Primary Examiner* — Jennifer Doan
(74) *Attorney, Agent, or Firm* — Inventor Assistance Foundation

(57) ABSTRACT

A buffer tube clencher (47) elongates a buffer tube (43) in a cable manufacturing machine (41) to reduce excess fiber length (EFL). The clencher (47) includes first (49,57) and second (69,73) sets of wheels with first and second gaps (63) therebetween to guide the buffer tube (43). At least one wheel of the first set of wheels (49,57) and of the second set of wheels (69,73) is driven to cause the buffer tube (43) to elongate, and at least one wheel of the first set of wheels (49,57) and of the second set of wheels (69,73) is biased and able to move away from the other wheel against a biasing force to accommodate an imperfection in the outer surface of the buffer tube (43), such that the buffer tube (43) remains under an elongation force by at least one driven wheel even if slippage occurs as the imperfection passes by the other driven wheel of the first and second sets of wheels.

38 Claims, 11 Drawing Sheets

(56) References Cited

U.S. PATENT DOCUMENTS

| | | | | |
|---|---|---|---|---|
| 9,195,019 | B1 * | 11/2015 | Parris | G02B 6/443 |
| 2015/0344260 | A1 * | 12/2015 | Seppelin | B05C 13/02 118/420 |

* cited by examiner

QUAD WHEEL BUFFERING TUBE CLENCHER CAPSTAN

1. FIELD OF THE INVENTION

The present invention relates to a fiber cable having a buffer tube surrounding at least one optical fiber. More particularly, the present invention relates to a structure within a cable manufacturing machine to stretch or elongate the buffer tube so that the length of the buffer tube will more closely match the length of the optical fiber(s) contained within the buffer tube in the final, manufactured cable.

2. DESCRIPTION OF THE BACKGROUND

A machine for producing a fiber optic cable typically places one or more optical fibers within a buffer tube, e.g., by extruding a buffer tube over a plurality of optical fibers. As discussed in published US application 2010/0092140, which is herein incorporated by reference, the buffer tube protects the optical fiber(s) therein by reducing the chance of macrobend and microbend losses within the optical fiber(s). After extrusion, the buffer tube is cooled, e.g., by passing the buffer tube with the optical fibers therein through a cooling water bath. Because the temperature and expansion/contraction coefficient of the optical fibers is different from the extruded material used to form the buffer tube, the buffer tube shrinks more than the optic fibers during the cooling process. This leads to excess fiber length (EFL).

EFL is a well-known issue in the art. The solution is to engage the buffer tube with a frictional force and elongate the buffer tube while it is hot. Then as the buffer tube cools and contracts, the buffer tube will contract to a length more matching to the length of the one or more optical fibers within the buffer tube.

To elongate the buffer tube during a cable manufacturing process, equipment has been offered by several companies. For example, Maillefer North America of Pawcatuck, Connecticut offers capstans and caterpillars common to the cable manufacturing industry. FIG. 1 shows a caterpillar 31 with an entrance 33 and an exit 35 for a buffer tube containing one or more optical fibers therein. Within the caterpillar 31, an upper belt 37 and a lower belt 39 elongate, e.g., stretch, the buffer tube and may be pneumatically controlled to keep a good frictional engagement to the outer surfaces of the buffer tube. More details can be seen in Maillefer's U.S. Pat. Nos. 5,092,117 and 5,102,584, each of which is herein incorporated by reference.

Rosendahl Nextrom OY of Vantaa, Finland is the assignee of U.S. Pat. No. 10,099,888, which is herein incorporated by reference. As shown in FIG. 2 (FIG. 5 of U.S. Pat. No. 10,099,888), Nextrom offers a cable manufacturing machine which includes a different structure to address excess fiber length (EFL).

In FIG. 2, optical fibers 15 are fed from payoff reels 16 to an extruder 20. The extruder 20 extrudes a polymer buffer tube to surround the optical fibers 15 to form a cable element 4. The cable element 4 is passed into a cooling trough 3 filled with water. The optical fibers 15 are loosely held within the buffer tube such that the optical fibers 15 are not embedded or attached to the buffer tube. A gel may optionally surround the optical fibers 15 within the buffer tube.

At least one of first and second pulleys 1 and 2 are driven by a first motor 19. The first and second pulleys 1 and 2 are frictionally engaged to the cable element 4, i.e., the outer surface of the buffer tube, and pull the buffer tube forward. A main capstan 17 is positioned downstream of the first and second pulleys 1 and 2 and is driven by a main capstan motor 21 to pull the cable element 4 forward. To deal with EFL, the pair of pulleys 1 and 2 are driven by the first motor 19 so as to pull the cable element 4 at a faster forward speed as compared to the forward speed at which the main capstan 17 pulls the cable element 4.

As a result, the buffer tube will be elongated by the first and second pulleys 1 and 2, such that the buffer tube is slightly longer than the optical fibers 15 therein at the position of the first and second pulleys 1 and 2. As the buffer tube continues through the cooling trough 3, the buffer tube shrinks faster than the optic fibers 15 therein, such that by the time the cable element 4 reaches the main capstan 17 the buffer tube has contracted to a length approximately equal to the optical fibers 15 therein.

The finished cable element 4 is collected onto a collection reel 18. The collection reel 18 may be later used by another machine to form a fiber optic cable. For example, an outer jacket may be extruder over the cable element 4 to form a fiber optic cable. Alternatively, the cable element 4 may be added as a subunit within a fiber optic cable having plural buffer tubes, or added as a subunit to a hybrid cable having other cable elements 4 and/or conductive elements.

Various other belt and pulley drive configurations to move an article are known in the art of cable manufacturing, and also in other fields of technologies remote from the field of cable manufacturing, such as the drive configurations, shown in U.S. Pat. Nos. 4,235,362; 4,893,998; 6,135,336; 7,293,682 and 7,322,220, each of which is herein incorporated by reference.

SUMMARY OF THE INVENTION

The Applicant has appreciated drawbacks with the manufacturing equipment used to elongate a buffer tube and address EFL. The belt-drive system of the caterpillar 31 of FIG. 1 works well. However, the drive pulleys and guides for the upper and lower belts 37 and 39 are numerous, and are driven by and supported by complicated structures. The upper and lower belts 37 and 39 are quite long and are considered wear parts that need periodic replacement. Therefore, the initial equipment purchase price is expense and replacement belts are expensive. Also, the down time for the adjustment and replacement of the belts, and cleaning/repair of the pulleys, guides and complicated supporting structures can be extensive. Long maintenance periods result in less cable production.

The first and second pulleys 1 and 2 in the prior art extrusion line of FIG. 2 are cheaper to purchase initially, and easier and cheaper to maintain and replace. However, the Applicant has discovered drawbacks to the first and second pulleys 1 and 2. One drawback relates to the amount of friction produced by the first and second pulleys. As the production line speed is increased, there seemed to be insufficient friction produced by the first and second pulleys 1 and 2 to elongate the buffer tube.

Another drawback relates to the spacing between the first and second pulleys 1 and 2. The spacing between the first and second pulleys 1 and 2 is initially set so that the second pulley 2, driven by the first motor 19, exerts enough pressure, i.e., friction, on the outer surface of the buffer tube to cause the elongation of the buffer tube. As the cable element 4 is pulled past the first and second pulleys 1 and 2, there is often a slight irregularity in the outer surface of the buffer tube, e.g., a bump. Since there is no "give" or adjustability in the spacing between the first and second pulleys 1 and 2, the bump often causes the buffer tube to break at the first and second pulleys 1 and 2.

The fault occurrence results in a shutdown of the manufacturing line, a recycling of the partial length of the cable element 4 thus far produced, and a resetting of the manufacturing line to start production of another cable element 4. The breakage occurs more frequently as the production speed of the cable element 4 is increased. This is wasteful, as the slight bump in the outer surface of the buffer tube would not have harmed the performance of the cable element 4. Therefore, the manufacturing line must be operated at a slower than optimal speed to decrease the number of fault occurrences, so as to reduce the waste of producing only partial lengths of cable elements 4 and non-production time spent resetting the manufacturing equipment.

One solution considered by the Applicant was to provide some "give" or adjustability to the mounting system of the first pulley 1. The adjustability could be provided by a spring or hydraulic/pneumatic linkage, e.g., a shock absorber. The adjustably mounted first pulley 1 would allow the slight bump, e.g., imperfection, in the outer surface of the buffer tube to pass between the first and second pulleys 1 and 2 without causing a breakage of the buffer tube.

However, this solution introduced a second drawback. When a bump in the outer surface of the buffer tube moved the first pulley 1 away from the second pulley 2 slippage occurred and the buffer tube was momentarily not elongated. This potentially resulted in a short section of buffer tube with an enlarged diameter, which may cause problems when the cable element 4 is later processed into a fiber optic cable or hybrid cable. More importantly, the slippage could also hinder the EFL performance of the manufacturing process in that the optical fibers within the buffer tube show more excess length as compared to the buffer tube.

It is an object of the present invention to address the drawbacks of the prior art, as appreciated by the Applicant. It is a further object of the present invention to provide a manufacturing device which can produce a cable element 4 at a faster speed as compared to the prior art extrusion line depicted in FIG. 2, while reducing the downtime due to breakages of the buffer tube of the cable element 4.

These and other objectives are accomplished by a buffer tube clencher which elongates a buffer tube in a cable manufacturing machine to reduce the issues associated with EFL. The clencher includes first and second sets of wheels with first and second gaps therebetween to guide the buffer tube. At least one wheel of the first set of wheels and of the second set of wheels is driven to cause the buffer tube to elongate, and at least one wheel of the first set of wheels and of the second set of wheels is biased and able to move away from the other wheel against a biasing force to accommodate an imperfection in the outer surface of the buffer tube, such that the buffer tube remains under an elongation force by at least one driven wheel even if slippage occurs as the imperfection passes by the other the driven wheel of the first and second sets of wheels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION OF EMBODIMENTS OF THE INVENTION

Figure 1:
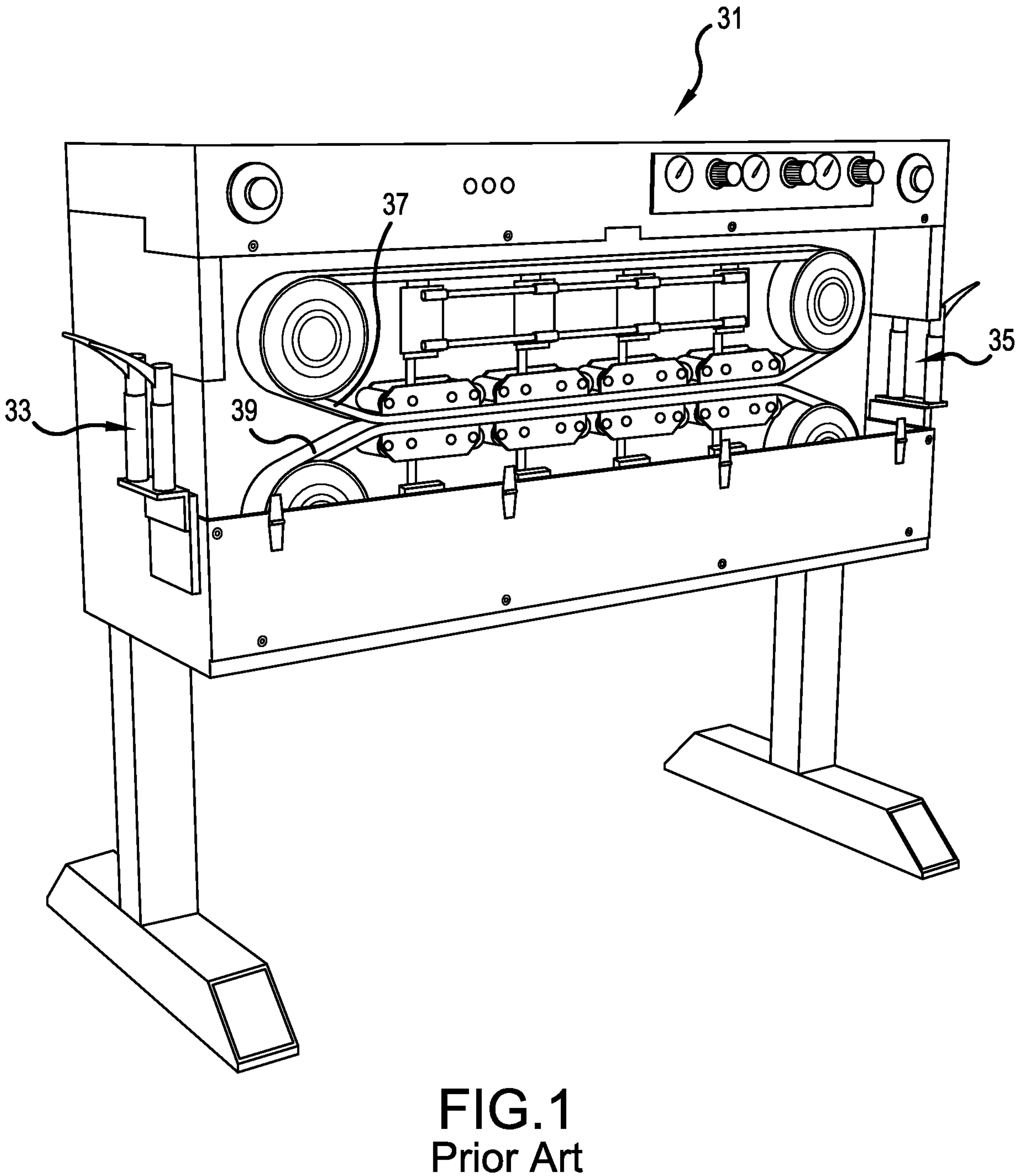
FIG. 1 is a perspective view of a caterpillar to elongate a buffer tube, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It will be understood that when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “lateral”, “left”, “right” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as “under” or “beneath” other elements or features would then be oriented “over” the other elements or features. The device may be otherwise oriented (rotated 90 degrees or at other orientations) and the descriptors of relative spatial relationships used herein interpreted accordingly.

A cable element manufacturing machine 41 includes one or more payoff reels 16 for supplying one or more optical fibers 15. An extruder 20 receives the one or more optical fibers 15 and extrudes a buffer tube 43 (See FIG. 6) around the one or more optical fibers 15 to form a cable element 4.

A main capstan 17 driven by a main capstan motor 21 pulls, e.g., advances, the cable element 4 in a forward direction 5 (left to right in FIG. 3) at an advancement speed. A cooling section 45, downstream of the extruder 20, cools the cable element 4, which contracts the buffer tube 43 relative to the one or more optical fibers 15 therein. In a preferred embodiment, the cooling section 45 includes a trough 3 with water therein. However, the cooling section 45 may be accomplished in other manners such as by a chilled air flow. A collection reel 18, downstream of the cooling section 45, collects the finished cable element 4. These just described elements 3, 15, 16, 17, 18, 20 and 21 may be made in accordance with the prior art, such as shown and described in connection with FIG. 2.

The present invention involves a new buffer tube clencher 47. The buffer tube clencher 47 is located between the extruder 20 and at least a portion of the cooling section 45. For example, the buffer tube clencher 47 may be located near the beginning of the cooling section 45, e.g., within or outside of the trough 3. As with the prior art, the buffer tube clencher 47 is designed for elongating the buffer tube 43 relative to the optical fibers 15 therein.

Figure 4:
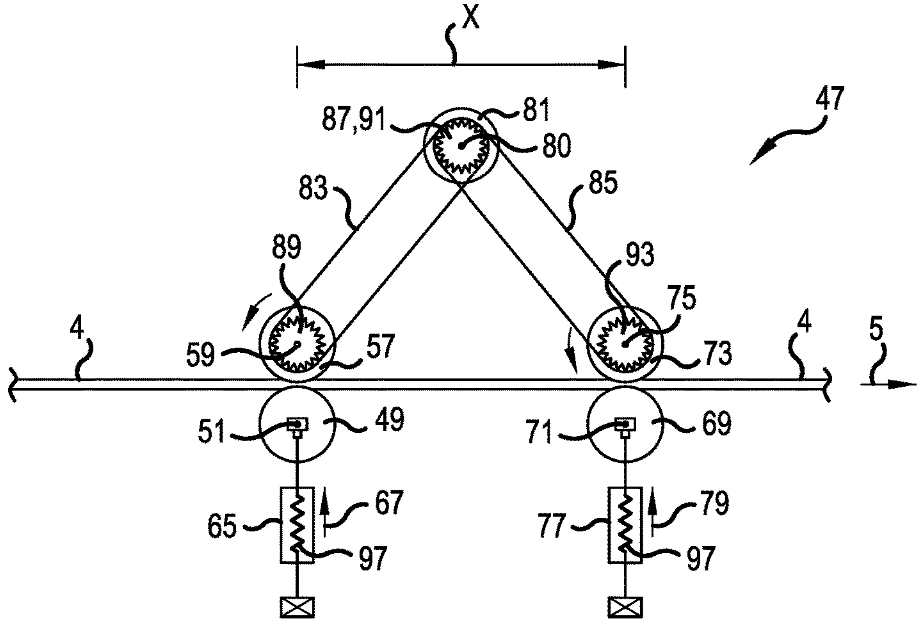
FIG. 4 is a diagram of the buffer tube clencher in the extrusion line of FIG. 3.
Figure 5:
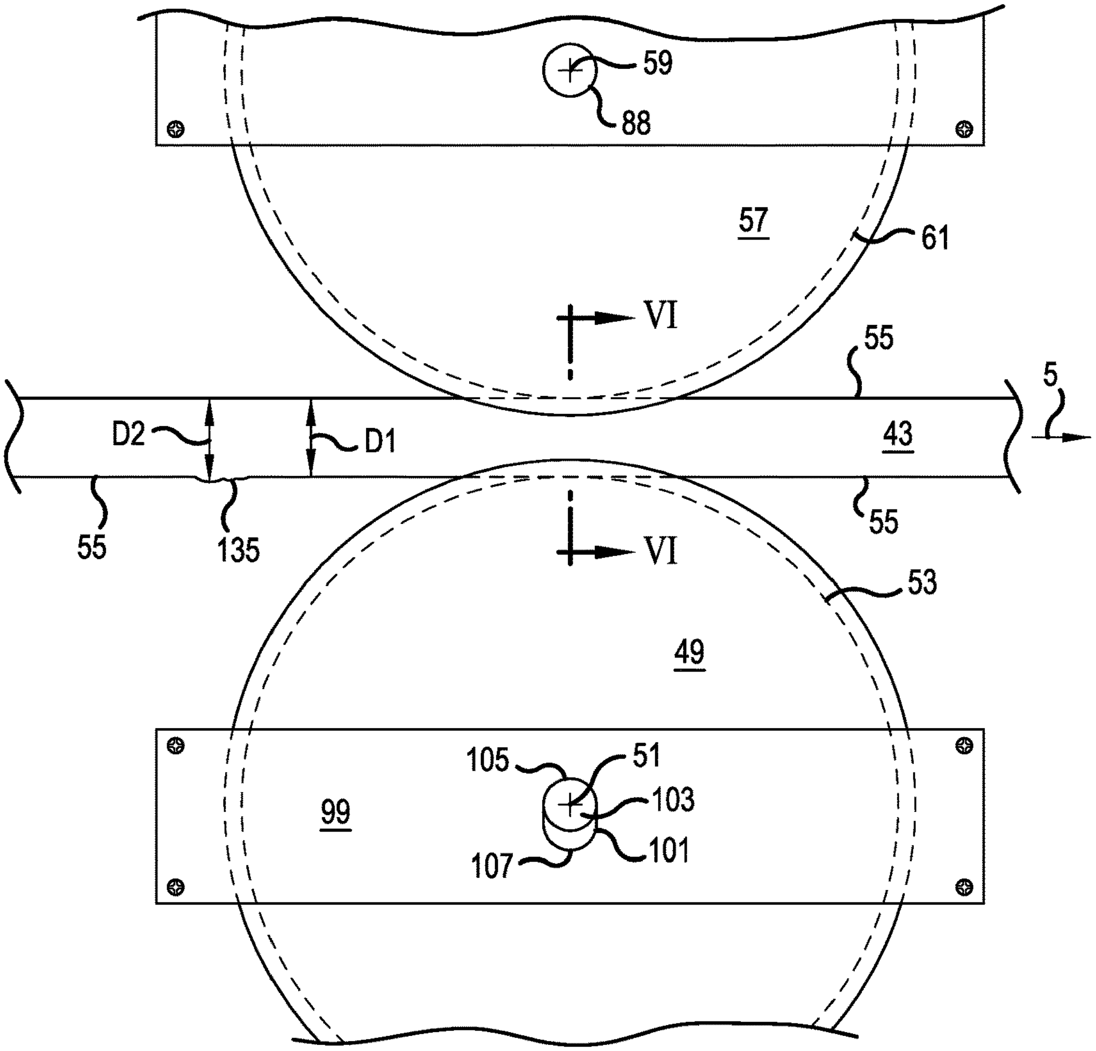
FIG. 5 is a close-up view of a section of FIG. 4 where first and second guiding wheels engage the buffer tube.
Figure 6:
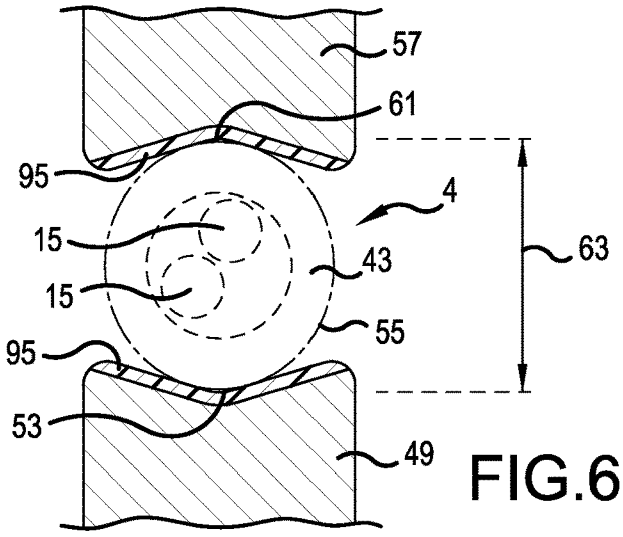
FIG. 6 is a cross sectional view taken along line VI-VI in FIG. 5.

The features of the present invention are best seen in FIGS. 4-6, where FIG. 4 is a diagram of the buffer tube clencher 47, FIG. 5 is a close-up view of a section of FIG. 4 where first and second guiding wheels 49 and 57 engage the buffer tube 43, and FIG. 6 is a cross sectional view taken along line VI-VI in FIG. 5. The buffer tube clencher 47 includes a first set of guiding wheels including the first guiding wheel 49 which rotates about a first axis 51. The first guiding wheel 49 includes a first circular surface 53 to engage an outer surface 55 of the buffer tube 43. The second guiding wheel 57 rotates about a second axis 59. The second guiding wheel 57 includes a second circular surface 61 to engage the outer surface 55 of the buffer tube 43.

The second axis 59 is spaced from and parallel to the first axis 51, such that a first gap with a dimension 63 is formed between the first and second circular surfaces 53 and 61. A first biasing element 65 applies a first biasing force 67 tending to cause the first circular surface 53 to move toward the second circular surface 61. The first circular surface 53 can move in a direction away from second circular surface 61 against the first biasing force 67 of the first biasing element 65 when a force is applied to the first circular surface 53. When this occurs, the first gap’s dimension 63 may become larger.

The buffer tube clencher 47 also includes a second set of guiding wheels including a third guiding wheel 69 which rotates about a third axis 71 and a fourth guiding wheel 73 which rotates about a fourth axis 75. The third guiding wheel 69 includes a third circular surface to engage the outer surface 55 of the buffer tube 43, while the fourth guiding wheel 73 includes a fourth circular surface to engage the outer surface 55 of the buffer tube 43. The third and fourth guiding wheels 69 and 73 may be built the same as the first and second guiding wheels 49 and 57, shown in FIGS. 5 and 6.

The fourth axis 75 is spaced from and parallel to the third axis 71, such that a second gap with the dimension 63 is formed between the third and fourth circular surfaces of the third and fourth guiding wheels 69 and 73, respectively. A second biasing element 77 applies a second biasing force 79 tending to cause the third circular surface to move toward the fourth circular surface. The third circular surface can move in a direction away from the fourth circular surface against the second biasing force 79 of the second biasing element 77, when a force is applied to the third circular surface, so that the second gap may become larger.

As best seen in FIG. 4, at least one of the first and second guiding wheels 49 and 57 is driven at a first rotational speed by a buffer tube clencher motor 81. Likewise, at least one of the third and fourth guiding wheels 69 and 73 is driven at approximately the first rotational speed by the buffer tube clencher motor 81. A first drive linkage 83 connects the buffer tube clencher motor 81 to the second guiding wheel 57 and a second drive linkage 85 connects the buffer tube clencher motor 81 to the fourth guiding wheel 73.

As depicted in FIG. 4, the first drive linkage 83 may take the form of a first chain or belt, which engages a first gear or pulley 87 attached to a drive shaft 80 of the buffer tube clencher motor 81 and connects the same to a second gear or pulley 89 attached to a second axle 88 of the second guiding wheel 57, concentric to the second axis 59. Likewise, the second drive linkage 85 may take the form of a second chain or belt 85, which engages a third gear or pulley 91 attached to the drive shaft 80 of the buffer tube clencher motor 81 and offset from the first gear or pulley 87. The second chain or belt 85 connects the third gear or pulley 91 to a fourth gear or pulley 93 attached to a fourth axle of the fourth guiding wheel 73, concentric to the fourth axis 75. Instead of first and second drive linkages 83 and 85, it would also be possible to use a single serpentine chain or belt, which would spare the cost of having the third gear or pulley 91 attached to the drive shaft 80 of the buffer tube clencher motor 81.

In a preferred embodiment, a coating 95 (see FIG. 6) is formed on the second circular surface 61 of the second guiding wheel 57. The coating 95 has a higher coefficient of friction as compared to a material, e.g., stainless steel, aluminum, or other metal or metal alloy, forming the second guiding wheel 57. Likewise, the coating 95 is formed on the fourth circular surface of the fourth guiding wheel 73. The coating 95 may optionally be formed on the first circular surface 53 of the first guiding wheel 49 and on the third circular surface of the third guiding wheel 69, so that all of the guiding wheels 49, 57, 69 and 73 are similarly fabricated and interchangeable. The coating 95 may include at least one of a diamond coating, rubber coating and a polymer coating.

The coating 95 increases a frictional coefficient and allows the buffer tube clencher motor 81 to pull the cable element 4 in the forward direction 5 with a minimum of slippage. The rotational speed of the second and fourth guiding wheels 57 and 73 of the buffer tube clencher 47 results in the buffer tube 43 being moved in the forward direction 5 faster than the advancement speed of the cable element 4 at the main capstan 17. The speed difference elongates the buffer tube 43 relative to the one or more optical fibers 15 within the buffer tube 43.

A problem in the prior art was that a slight irregularity in the outer shape or size of the buffer tube 43 would cause the buffer tube 43 to break at the buffer tube clencher. The first and second biasing elements 65 and 77 help to address this issue. The first biasing element 65 may include a spring 97 pulling or pushing the first circular surface 53 toward the second circular surface 61. FIG. 4 shows the springs 97 are pushing the first circular surface 53 toward the second circular surface 61 (with regard to the first and second guiding wheels 49 and 57) and pushing the third circular surface toward the fourth circular surface (with regard to the third and fourth guiding wheels 69 and 73). Although springs 97 are shown, the first and second biasing elements 65 and 77 may include chambers with pneumatic or hydraulic actuated pressure or vacuum moving plungers to create the first and second biasing forces 67 and 79.

It is important to note that the first and second biasing elements 65 and 77 act independently. In other words, the first circular surface 53 can move in a direction away from the second circular surface 61, while the third circular surface remains at the dimension 63 from the fourth circular surface. One potential embodiment of the manner in which the first circular surface 53 may move away from second circular surface 61 is depicted in FIG. 5. A first holder 99 incudes a first opening, formed as a first slot 101. A first axle 103 is configured to support the first guiding wheel 49, such that the first guiding wheel 49 rotates about the first axis 51. In other words, the first axis 51 passes through a center of the first axle 103. The first axle 103 resides within the first slot 101.

The first biasing element 65 tends to move the first axle 103 to bias the first circular surface 53 toward the second circular surface 61. In the embodiment depicted in FIG. 5, the first biasing element 65 causes the first axle 103 to reside near or at a first end 105 of the first slot 101. Deflection of the first circular surface 53 away from the second circular surface 61 causes the first axle 103 to move away from the first end 105 of the first slot 101 and toward a second, opposite end 107 of the first slot 101. The second biasing element 77 may permit movement in a same or similar manner with regard to the third and fourth circular surfaces of the third and fourth guiding wheels 69 and 73.

Figure 7:
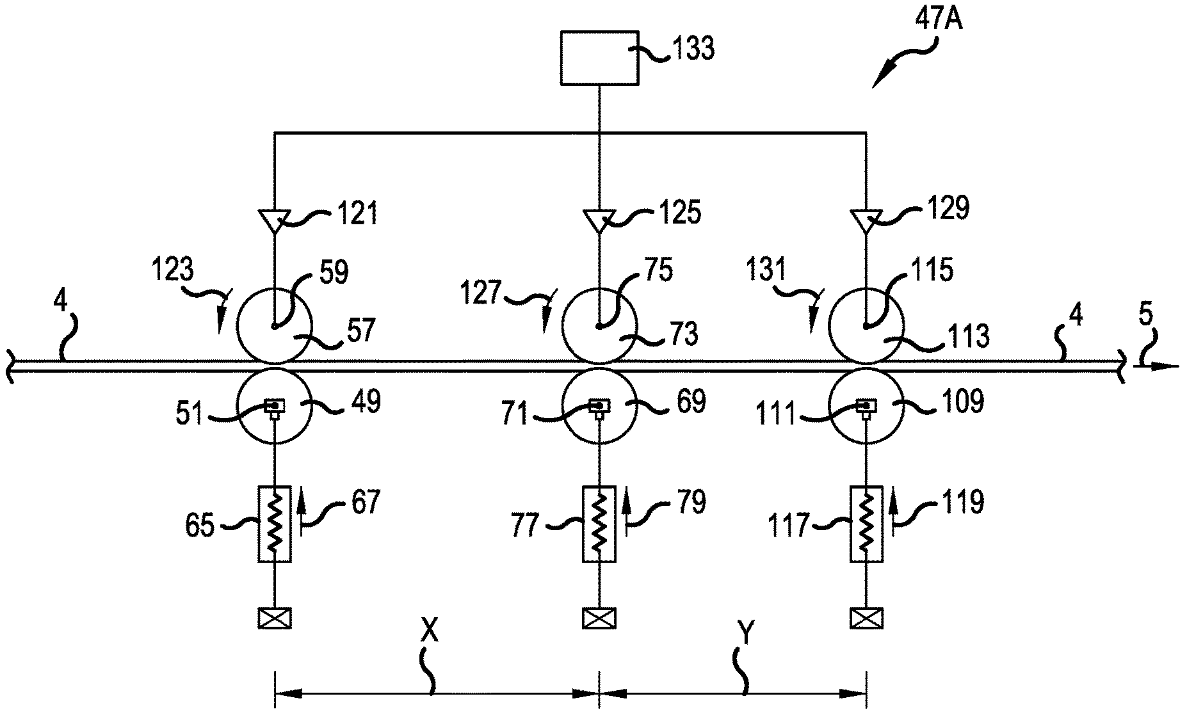
FIG. 7 is a diagram of a buffer tube clencher, in accordance with a second embodiment of the present invention.

FIG. 7 depicts a modified buffer tube clencher 47A, in accordance with a second embodiment of the present invention. The same or similar elements, as compared to FIG. 4, have been labeled with the same reference numerals. A first difference in the second embodiment of the buffer tube clencher 47A is the presence of a third set of guiding wheels including a fifth guiding wheel 109 which rotates about a fifth axis 111 and a sixth guiding wheel 113 which rotates about a sixth axis 115. The fifth guiding wheel 109 includes a fifth circular surface to engage the outer surface 55 of the buffer tube 43, while the sixth guiding wheel 113 includes a sixth circular surface to engage the outer surface 55 of the buffer tube 43. The fifth and sixth guiding wheels 109 and 113 may be built the same as the first and second guiding wheels 49 and 57, shown in FIGS. 5 and 6.

The sixth axis 115 is spaced from and parallel to the fifth axis 111, such that a third gap with the dimension 63 is formed between the fifth and sixth circular surfaces of the fifth and sixth guiding wheels 109 and 113, respectively. A third biasing element 117 applies a third biasing force 119 tending to cause the fifth circular surface to move toward the sixth circular surface. The fifth circular surface can move in a direction away from the sixth circular surface against the third biasing force 119 of the third biasing element 117, when a force is applied to the fifth circular surface, so that the third gap may become larger. The third biasing element 117 may be constructed the same as the first and second biasing elements 65 and 77 discussed above.

As best seen in FIG. 7, the drive system in the second embodiment, is different from the drive system in the embodiment of FIG. 4. A first electronically controlled servo motor 121 is connected to at least one of the first and second guiding wheels 49 and 57, such as a hub motor within the second guiding wheel 57 to drive rotation of the second guiding wheel 57. For example, the second guiding wheel 57 is driven to rotate in the direction of arrow 123 at a first rotational speed. A second electronically controlled servo motor 125 is connected to at least one of the third and fourth guiding wheels 69 and 73. For example, the fourth guiding wheel 73 is driven to rotate in the direction of arrow 127 at a second rotational speed. A third electronically controlled servo motor 129 is connected to at least one of the fifth and sixth guiding wheels 109 and 113. For example, the sixth guiding wheel 113 is driven to rotate in the direction of arrow 131 at a third rotational speed.

In a preferred embodiment a common controller 133 controls each of the first, second and third electronically controlled servo motors 121, 125 and 129, and the first, second and third rotational speeds at arrows 123, 127 and 131 are set to be the same speed. However, it is not necessary that the first, second and third rotational speeds are exactly equal. For example, the rotational speeds may be set to gradually elongate the buffer tube 43 in stages, such that the rotation at arrow 127 is slightly faster, e.g., 10% faster, than the rotation at arrow 123, and the rotation at arrow 131 is slightly faster, e.g., 5% faster, than the rotation at arrow 127.

An important feature of the present invention is the independent action of the first and second biasing elements 65 and 77 (FIGS. 4 and 5) and the independent action of the first, second and third biasing elements 65, 77 and 117 (FIG. 7). As best illustrated in FIG. 5, if a slight irregularity 135 exists in the outer surface 55 of the buffer tube 43, an enlarged diameter D2 may exist relative to the normal diameter D1 of the buffer tube 43. In the prior art, the enlarged diameter D2 would often cause the buffer tube 43 to break as it passed through the gap between the pulleys 1 and 2. In the present invention, the first guiding wheel 49 will deflect downward against the first biasing force 67 to permit the enlarged diameter D2 to pass therethrough.

During the instance of deflection, the frictional coefficient between the second guiding wheel 57 and the outer surface 55 of the buffer tube 43 will be reduced. If only a single set of guiding wheels were provided as with the prior art of FIG. 2, this reduced friction could lead to the buffer tube 43 having an instant wherein the buffer tube 43 was not being elongated. Such an instant, could lead to a ring of increased thickness along the buffer tube 43 and excess fiber length in the final cable element 4. Either circumstance should be avoided if possible.

By the present invention, during the instance of deflection of the first guiding wheel 49, the buffer tube 43 is still fully engaged between the third and fourth guiding wheels 69 and 73. The third guiding wheel 69 is not being deflected since the third guiding wheel 69 is locate a distance x downstream from the first guiding wheel 49. Therefore, the enlarged diameter D2 has not yet reached the third guiding wheel 69, and consequentially the fourth guiding wheel 73 has a good coefficient of friction with the outer surface 55 of the buffer tube 43. Hence, there is little to no slippage, and the buffer tube 43 remains under a constant elongating force. As the enlarged diameter D2 deflects the third guiding wheel 69, the first guiding wheel 49 is no longer deflected, and consequentially the second guiding wheel 57 has a good coefficient of friction with the outer surface 55 of the buffer tube 43. Hence, there is little to no slippage, and the buffer tube 43 remains under a constant elongating force.

In the second embodiment of FIG. 7, the third set of guiding wheels, i.e., the fifth and sixth guiding wheels 109 and 113, are located downstream a distance y from the second set of guiding wheels 69 and 73. During the instance of deflection of the first guiding wheel 49, the buffer tube 43 is still fully engaged between the third and fourth guiding wheels 69 and 73 and is still fully engaged between the fifth and sixth guiding wheels 109 and 113. Hence, there is little to no slippage, and the buffer tube 43 remains under a constant elongating force.

It may also be advantageous to set the distance y to be different from the distance x. In this manner, if periodic slight irregularities 135 exist along the outer surface 55 of the buffer tube 43 spaced at the distance x, the periodic slight irregularities 135 cannot simultaneously disrupt the coefficient of friction of the driven second, fourth and sixth guiding wheels 57, 73 and 113. Further, an uneven spacing given by different distances x and y may reduce, i.e., disrupt, a harmonic vibration in the buffer tube 4 as any slight irregularity 135 passes by and deflects the first, second and third guiding wheels 49, 69 and 109 at a high speed.

In order to avoid issues with periodic slight irregularities 135 and reduce harmonics, and it would also be possible to place one set of guiding wheels, e.g., the third and fourth guiding wheels 69 and 73, in a different plane, e.g., a plane offset by ninety degrees, as compared to the other sets of guiding wheels, e.g., the first and second guiding wheels 49 and 57. For example in FIG. 7, all of the sets of guiding wheels are illustrated as rotating in a same plane, i.e., the plane of FIG. 7. In other words, the first, second, third, fourth, fifth and sixth axes 51, 59, 71, 75, 111 and 115 are all parallel to each other and extend into and out of FIG. 7. It may be beneficial to place the third and fourth axes 71 and 75 at an offset of ninety degrees to reside in the plane of FIG. 7, so that the third and fourth guiding wheels 69 and 73 rotate into and out of the plane of FIG. 7 and engage different areas of the outer surface 55 of the buffer tube 43.

As used herein, the phrase "guiding wheel" should be interpreted to encompasses a pulley, capstan, roller and other rotating structure to drive a buffer tube in the forward direction. The term "approximately equal" may be interpreted to mean plus or minus 10%, more preferably plus or minus 5%, such as a 2% variation.

The buffer tube clencher described above may be considered capstan system, such as a standalone capstan system, which may be added to a production line to stretch a buffer tube during the manufacturing process. FIGS. 8-12 illustrate one example of a capstan system with specific structural features, with FIG. 11 showing the standalone nature of the capstan system, such that it may be easily added to an existing production line.

Figure 8:
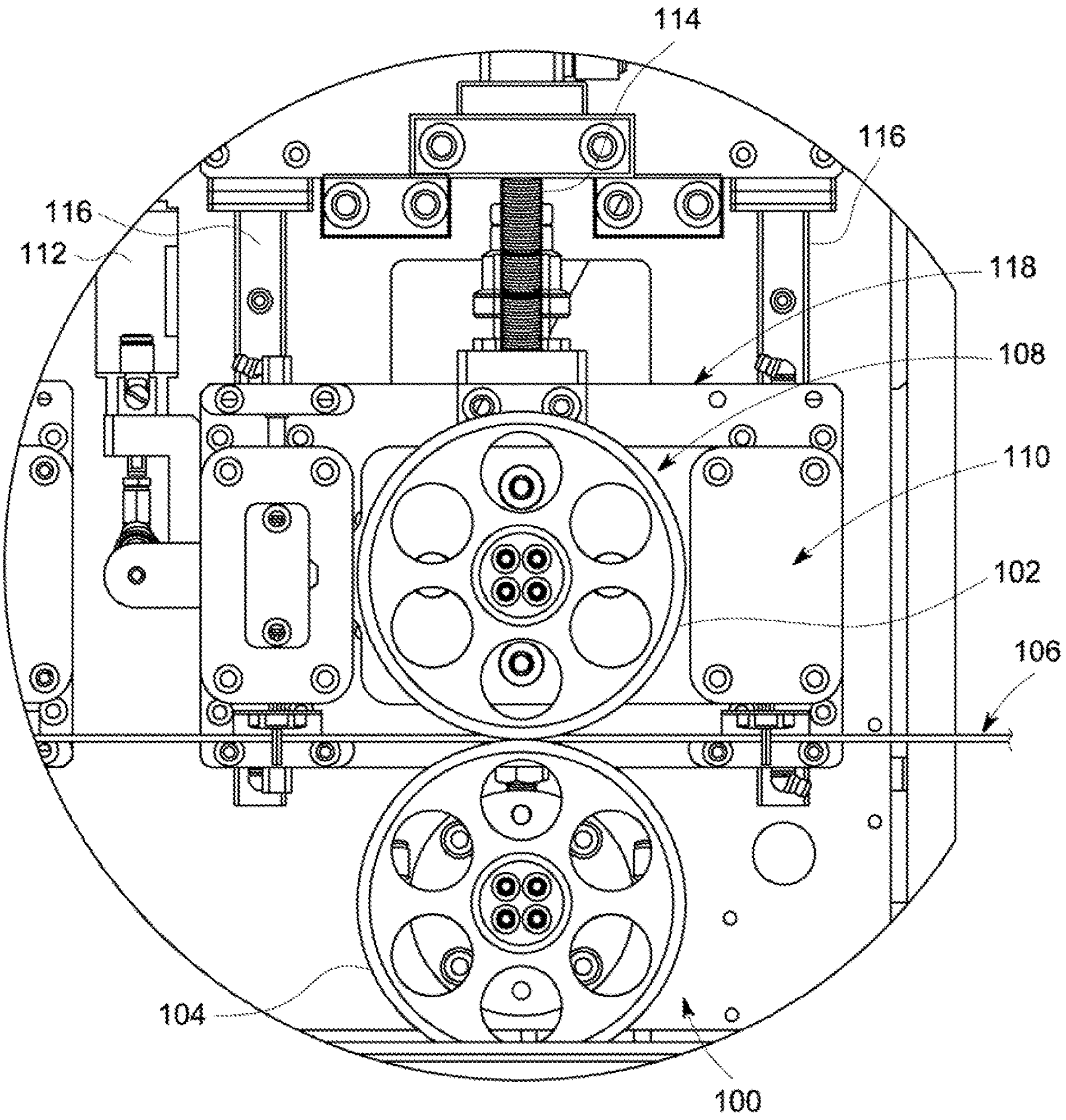
FIG. 8 is a closeup front view of one embodiment of a capstan system of the invention.

The capstan system shown in FIGS. 8-12 makes use of two capstans arranged in the same plane. FIG. 8 shows a close-up of one of the capstans 100, which includes an upper wheel 102 and a lower wheel 104. The upper and lower wheels 102, 104 clamp a buffer tube 106, which forms a loose sleeve around an inner optical fiber(s) (not shown).

In practice, the optical fiber(s) is fed off a bobbin (not shown) and the buffer tube 106 is extruded to form around the optical fiber(s). As the buffer tube 106 starts to cool after extrusion, it seeks to shrink lengthwise. The capstan system of the present invention prevents this from happening by gripping the buffer tube 106 and forcing it to move forward at a greater speed than the advance of the optical fiber(s) therein.

In order to adjust the pressure exerted by the upper wheel 102 on the buffer tube 106, the upper wheel 102 is mounted on a pivotable mounting plate 108. The mounting plate 108 is pivotably connected at its one end (behind plate 110) and connects to a clamping pressure cylinder, such as a pneumatic actuator 112, at its opposite end. Thus, the pressure exerted by the upper wheel 102 on the buffer tube 106 (clamping pressure) is controlled by the pneumatic actuator 112 that forces the upper wheel 102 into clamping engagement with the buffer tube 106 while still allowing the upper wheel 102 to ride up and down to accommodate changes in diameter in the buffer tube 106 and while maintaining a certain pressure.

The entire mechanism supporting the upper wheel 102 is also adjustable vertically in order to thread the buffer tube 106 between the upper and lower wheels 102, 104. This gross vertical adjustment is achieved by means of a pneumatic system discussed further below, which attaches to a central rod that includes an adjustment bolt and nut arrangement 114 for finely adjusting the vertical spacing of the upper wheel 102 from the lower wheel 104. The pneumatic system allows an arm 118 to ride up horizontally on support posts 116.

Figure 9:
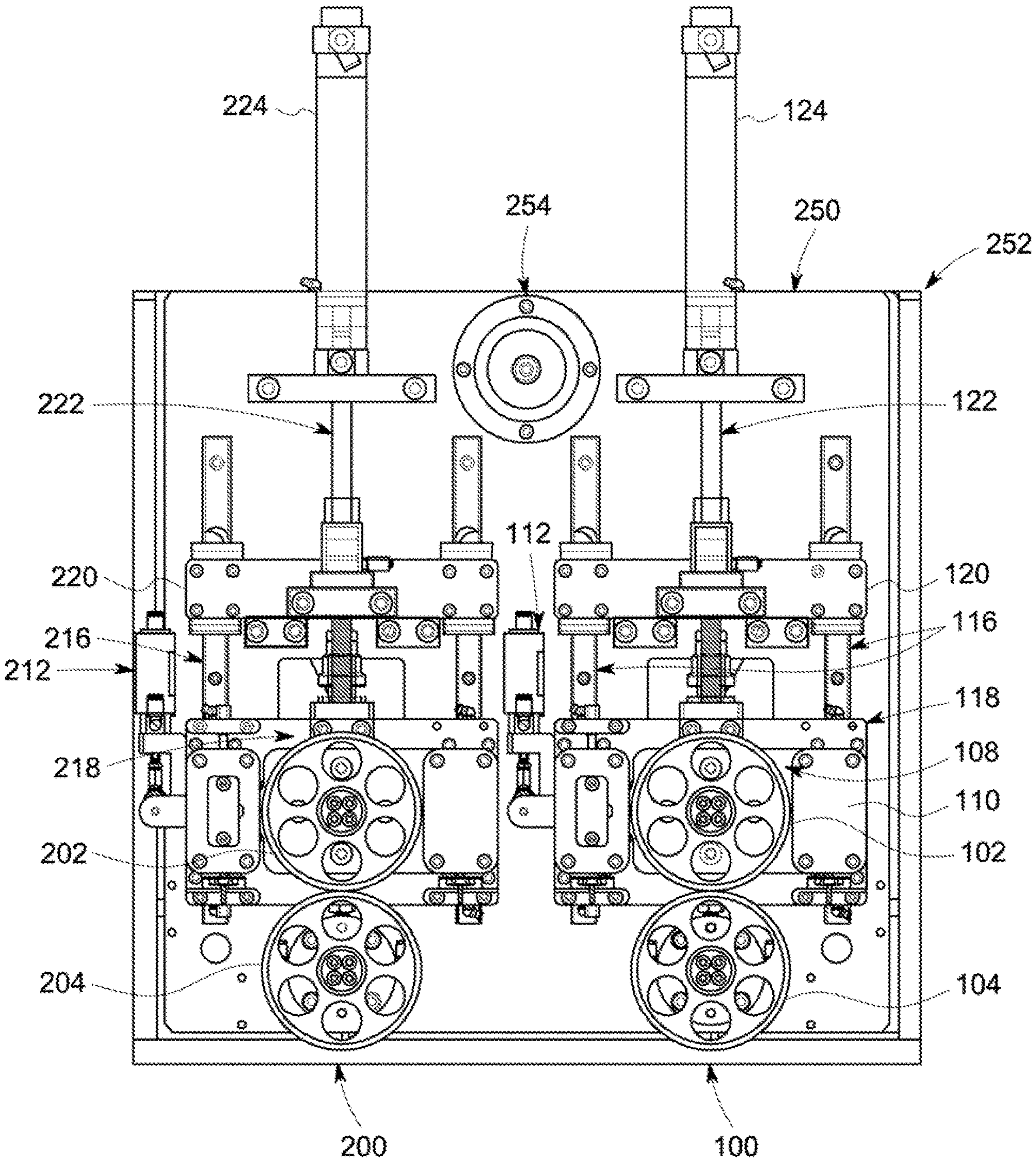
FIG. 9 is a front view of the capstan system of FIG. 8 showing additional elements of the system.

Referring to FIG. 9, the capstan system of the present embodiment is shown in front view with both capstans 100 and 200 visible. The posts 116 of the capstan 100 extend through a mounting block 120. The mounting block 120, in turn is connected to a piston shaft 122 that allows the block 120 to move up or down by virtue of a pneumatic cylinder 124, which together with the piston shaft 122 forms the pneumatic system mentioned above. The capstan 200 is similarly mounted for pivotal adjustment of upper wheel 202 by means of a clamping pressure cylinder, such as a pneumatic actuator 212. As with the capstan 100, gross vertical adjustment of the upper wheel 202 of the capstan 200 relative to the lower wheel 204 for purposes of threading the buffer tube 106 is similarly achieved by means of a second pneumatic system that includes pneumatic cylinder 224 and piston shaft 222 attached to block 220.

The capstan system with its two capstans 100, 200 is mounted on a support plate 250 which is in turn pivotably mounted to a housing 252 by means of pivot 254 defined by a bearing. As the two capstans 100, 200 propel the buffer tube 106 forward, a backward force is exerted on the plate 250. Referring to the rear view of FIG. 10, a pressure sensor in the form of a strain gauge 300 is shown which senses the pressure exerted by the plate 250 on the housing 252. This back pressure is related to the pressure exerted by the upper wheels 102, 202 on the buffer tube 106 and thus provides a relative measure of the pressure exerted by the upper wheels 102, 202 on the buffer tube 106. Thus, by monitoring the excess linear speed of the buffer tube 106 relative to the optical fiber(s) by virtue of the percentage difference in length of the buffer tube 106 relative to the optical fiber(s), any discrepancy in the desired excess linear speed can be adjusted by adjusting the pressure exerted by the pneumatic actuators 112, 212. The adjustment of the clamping pressure may be done manually or by including a feedback loop from the strain gauge 300 to a controller (not shown) that controls the pressure exerted by the pneumatic actuators 112, 212. By monitoring the extent to which the buffer tube 106 advances faster or slower than the optical fiber(s), the upper and lower wheels 102, 104, 202, 204 of the capstans 100, 200 can be sped up or slowed down to maintain the linear speed of the buffer tube 106 at a defined amount above that of the optical fiber(s), e.g., in this case between 1% and 5% faster, preferably 3% faster than the optical fiber(s). It will be appreciated that for different buffer tube materials the amount of shrinkage will differ, thereby requiring different pressures on the buffer tube 106 by the capstans 100, 200 to achieve the desired length difference between buffer tube 106 and optical fiber(s). It will be appreciated that insofar as the buffer tube material expands upon cooling, it would be necessary to slow the linear speed of the buffer tube 106 down relative to the optical fiber(s) within the buffer tube 106 in order to achieve the desired percentage length increase of the buffer tube 106 relative to the optical fiber(s).

Figure 10:
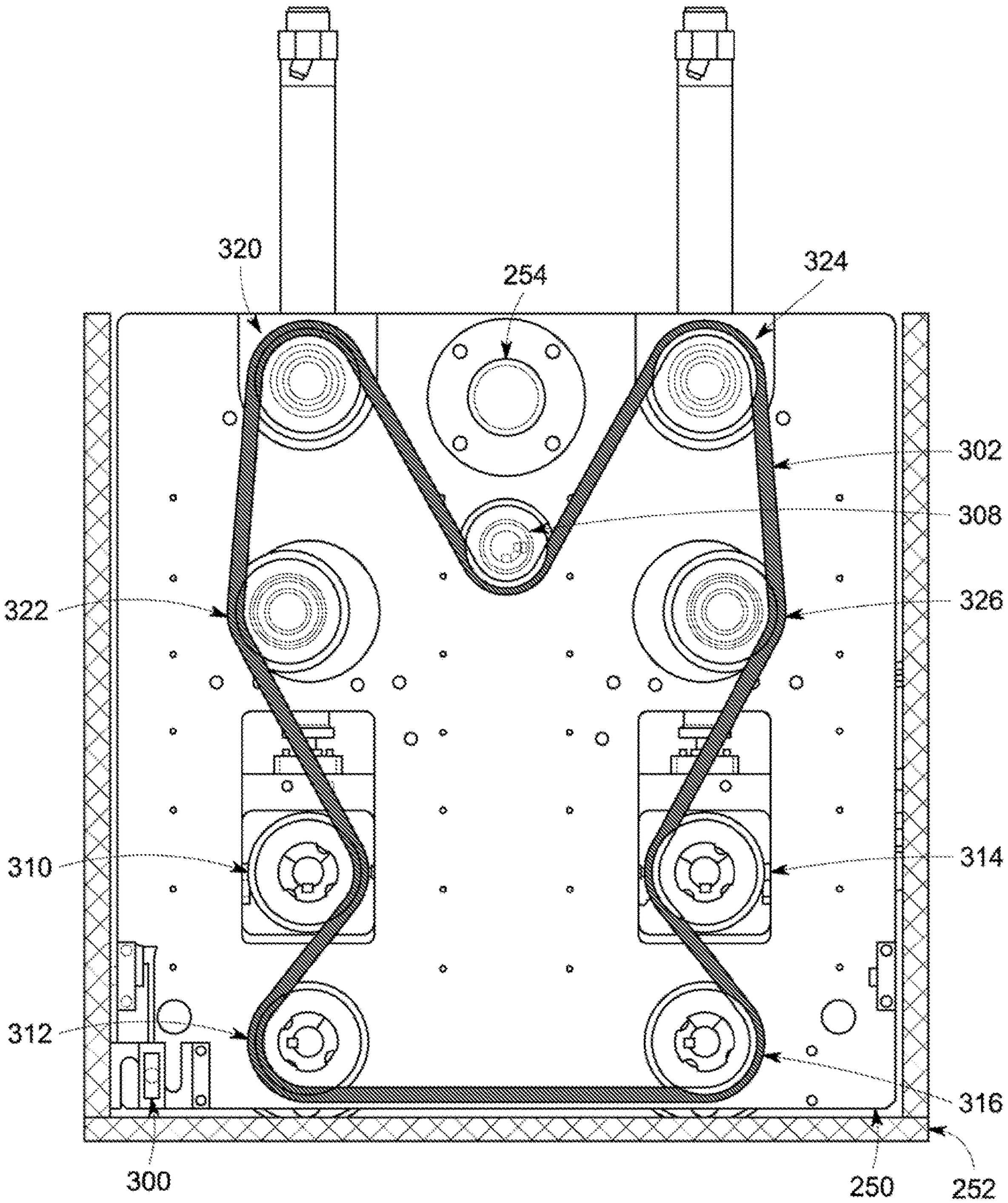
FIG. 10 is a rear view of the system of FIG. 9.
Figure 11:
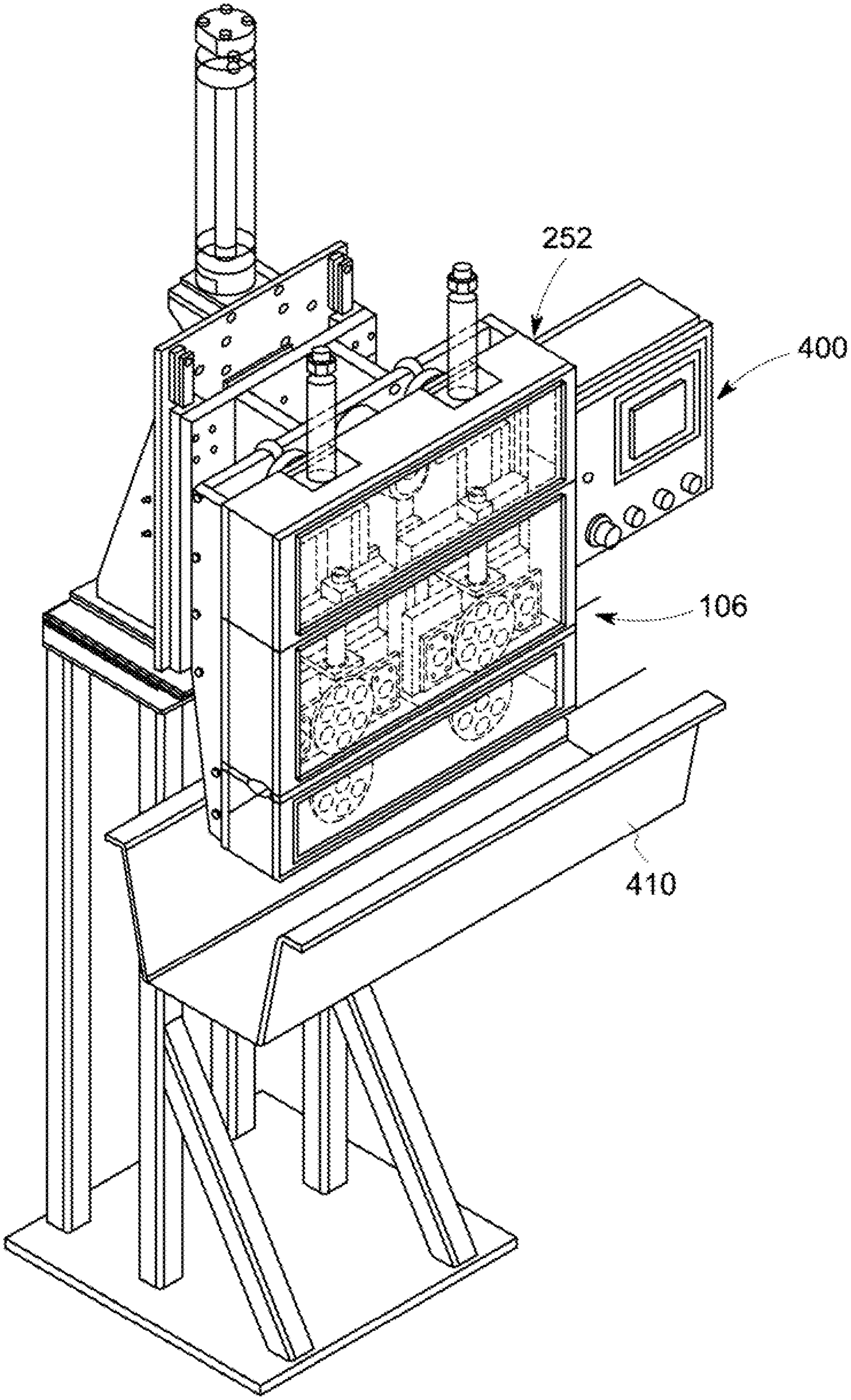
FIG. 11 is a three-dimensional view of one embodiment of a capstan system of the invention showing additional elements.

As shown in FIG. 10, in this embodiment both the upper and lower wheels 102, 104, 202, 204 of the two capstans 100, 200 are driven by a common servo motor (not shown) connected to drive shaft 308. A belt 302, driven by the servo motor loops around pulleys 310, 312, 314, 316 connected to shafts of the upper and lower wheels 102, 104, 202, 204, respectively, and around free-wheeling pulleys 320, 322, 324, 326. It will be appreciated that the upper and lower wheels 102, 104, 202, 204 could also be driven by means of separate drive mechanisms, e.g., separate servo motors.

Figure 2:
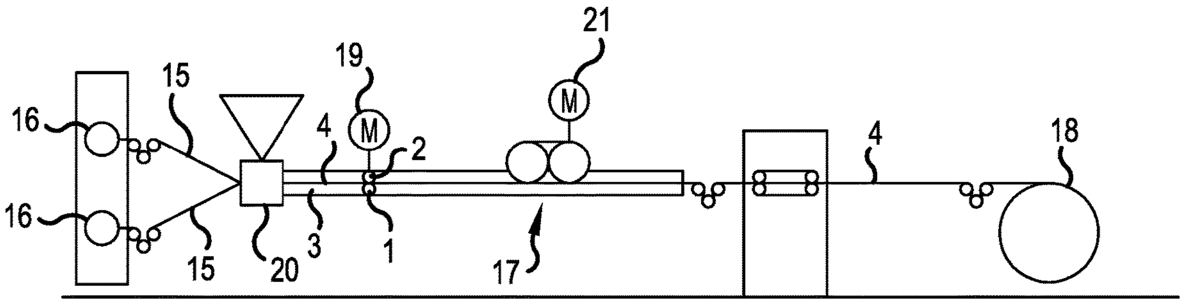
FIG. 2 is a block diagram of an extrusion line with a pair of pulleys to elongate a buffer tube, in accordance with the prior art.
Figure 3:
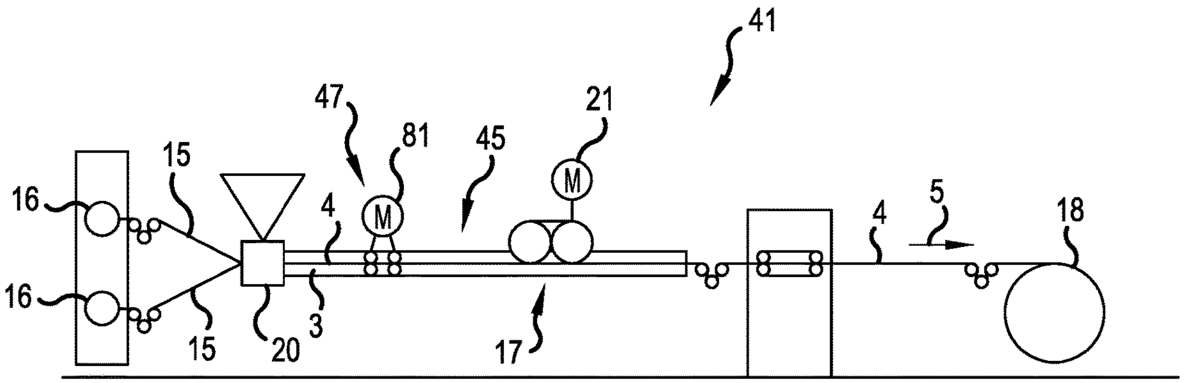
FIG. 3 is a block diagram of an extrusion line with a buffer tube clencher, in accordance with the present invention.

FIG. 11 shows the capstan system of FIGS. 8-10 together with the housing 252 and a controller 400. The system is controlled by a controller 400. A section of a drain 410, such as the cooling trough 3 of FIG. 2, is shown mounted beneath the capstan system. Both ends of the drain 410 extend further to the right and left (not shown) and have U-shaped or V-shaped profiles to hold a cooling water. As the buffer tube 106 passes from the extrusion station (not shown in FIG. 11, but similar to element 20 in FIG. 2), which is located upstream from the capstan system, it dips down into the upstream portion of the drain 410, which is constantly fed with heated water to slow down the cooling of the buffer tube 106. Similarly, once the buffer tube 106 leaves the capstan system it passes into the downstream portion of the drain 410, which is also fed with heated water to slow down the cooling and thus the linear shrinkage of the buffer tube 106. The heated water from the drain 410 and is recaptured and recycled for feeding back into the drain 410.

Figure 12:
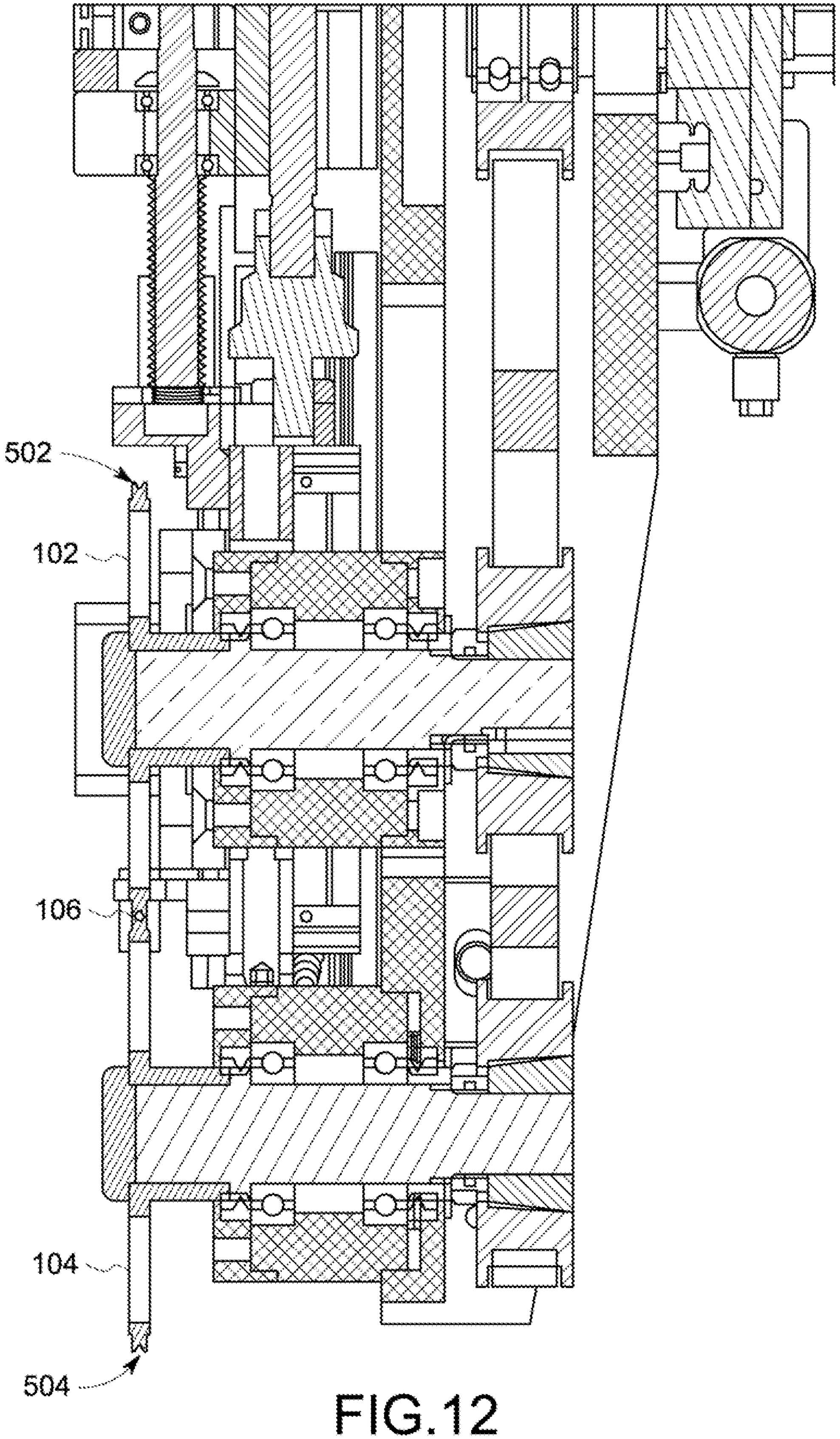
FIG. 12 is a sectional side view of the capstan system of FIG. 8.

FIG. 12 shows a section through the structure of FIG. 8. The upper wheel 102 and lower wheel 104 both have a concave surface 502, 504, respectively to accommodate the substantially circular cross-section of the buffer tube 106. This also applies to any other capstans used in this or other embodiments.

By providing a double capstan system, any imperfections or diameter changes in the buffer tube 106, which could cause slippage between the buffer tube 106 and capstan is avoided since there is a second capstan to maintain the requisite clamping pressure.

By monitoring the difference between the length of the buffer tube 106 and the optical fiber(s), any deviation from the desired length increase of the buffer tube 106 relative to the optical fiber(s) can be compensated for by adjusting the pressure exerted on the buffer tube 106 by the pneumatic actuators 112, 212 based on the back pressure sensed by the pressure sensors such as the strain gauge 300.

The use of a pressure adjustment means, which in this case is achieved by means of the pneumatic actuators 112, 212 allows easy adjustment of the pressure to ensure an optimum pressure exerted by the capstans 100, 200 on the buffer tube 106.

By monitoring the excess linear speed of the buffer tube 106 relative to the optical fiber(s), by monitoring the length difference, a more accurate measure of linear shrinkage control is achieved than in prior art systems that measure tension in the buffer tube 106 between a buffering-assist capstan and a downstream wet capstan driven at different speeds.

Figure 13:
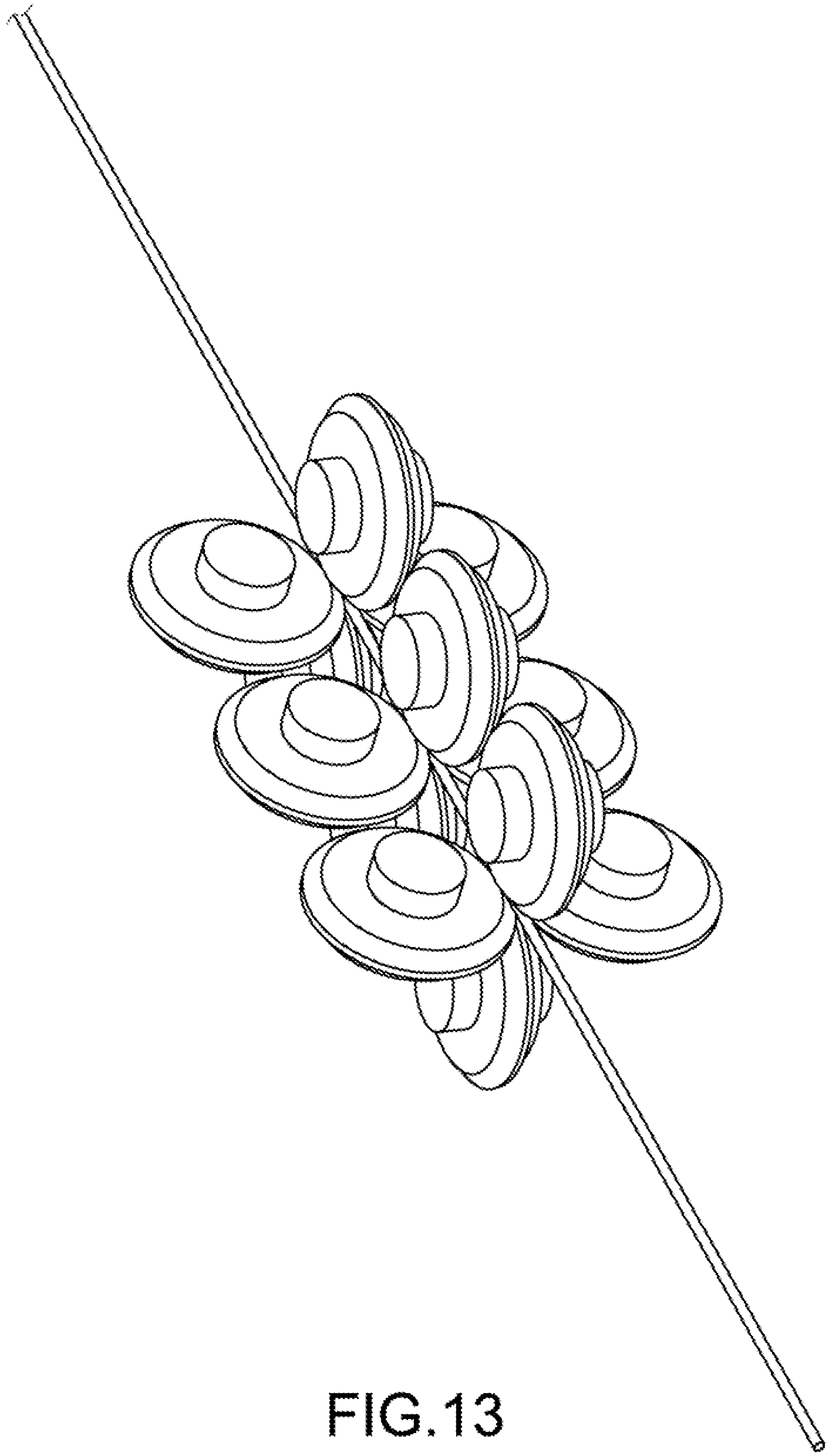
FIG. 13 is a three-dimensional view of another embodiment of a capstan arrangement of the invention.

In another embodiment, for example, more than two capstans may be arranged next to each other in a common plane. In yet another embodiment multiple capstans were arranged in a first plane (e.g., a vertical plane) and multiple capstans were arranged in a second plane (e.g., a horizontal plane). One such embodiment is shown in FIG. 13.

In yet another embodiment in which two capstans were arranged as in the embodiment of FIG. 9, the downstream capstan was provided with a slightly larger set of wheels to propel the buffer tube faster than the upstream capstan, thereby exerting an additional tension on the buffer tube and further stretching the buffer tube as it passes between the capstans.

In a general summary, the capstan systems of FIG. 8-13 control shrinkage of the buffer tube that surrounds the optical fiber(s), as the buffer tube cools following extrusion of the buffer tube, the system comprising at least two capstans engaging the buffer tube in a first plane, wherein each capstan incudes at least one driven wheel and wherein the driven wheels are driven at the same speed and the pressure exerted by each capstan on the buffer tube is controlled. Preferably all wheels are driven in order to minimize resistance.

The controlling of the pressure of each capstan on the buffer tube may comprise the use of one or more pressure sensors, e.g., strain gauges that sense the clamping pressure of the capstan on the buffer tube, and a pressure adjusting system, wherein the pressure adjusting system may comprise a pneumatic actuator. The capstan system may comprise more than two capstans in the first plane and may include multiple capstans in a second plane perpendicular to the first plane.

Further, according to the invention, there is provided a method of controlling the post-extrusion linear shrinkage of a buffer tube surrounding the optical fiber(s), comprising driving the buffer tube separately from the optical fiber(s) at a speed greater than that of the optical fiber(s), and controlling the relative speed of the buffer tube relative to the optical fiber(s) to maintain a defined difference in length of the buffer tube relative to the optical fiber(s), e.g., maintaining an increase in length of the buffer tube of between 1% and 5% of the length of the optical fiber(s), and preferably an increase in length of 3%.

The driving of the buffer tube may comprise engaging the buffer tube with at least two capstans that clamp the buffer tube in a first plane, each capstan comprising two opposing wheels that engage the buffer tube. The driving of the buffer tube may comprise engaging the buffer tube with at least two capstans that clamp the buffer tube in a first plane, and at least two capstans that clamp the buffer tube in a second plane perpendicular to the first plane. The capstans may be driven by a common drive motor, e.g., by means of a servo motor connected to all of the wheels by means of a belt-and-pulley arrangement, or the capstan wheels may be separately driven at the same speed. In order to achieve gross adjustment of the linear speed of the buffer tube created by the driven capstans, the size of the wheels may be changed or the speed of the capstans may be adjusted. Fine adjustments of the linear speed of the buffer tube may be achieved by adjusting the pressure of the capstans on the buffer tube.

The controlling of the length of the buffer tube relative to the optical fiber(s) may include monitoring the length difference between the buffer tube relative to the optical fiber(s) and adjusting the pressure of the capstans on the buffer tube.

The pressure exerted by the capstans on the buffer tube may be monitored by means of one or more pressure sensors, e.g., a strain gauge, and may include adjusting the clamping pressure by means of a pneumatic actuator.

It will be appreciated that the above embodiment is just one example of how to implement the present invention, and that the invention could be implemented in different configurations, e.g., with different pressure sensors, different drive mechanisms, and different pressure adjustment means, without departing from the scope of the invention. All such modifications as would be obvious to one skilled in the art are to be included within the scope of the following claims.

We claim:

1. A buffer tube clencher for elongating a buffer tube in a cable element manufacturing machine, said buffer tube clencher comprising:

- a first set of guiding wheels including:
  - a first guiding wheel which rotates about a first axis, said first guiding wheel including a first circular surface to engage an outer surface of the buffer tube; and
  - a second guiding wheel which rotates about a second axis, said second guiding wheel including a second circular surface to engage the outer surface of the buffer tube, wherein the second axis is spaced from and parallel to the first axis;
- a first gap formed between said first and second circular surfaces;
- a first biasing element applying a first biasing force causing said first circular surface to move toward said second circular surface, wherein said first circular surface can move in a direction away from said second circular surface against the first biasing force of said first biasing element when a force is applied to said first circular surface, so that the first gap may become larger, wherein at least one of said first and second guiding wheels is driven to rotate;
- a second set of guiding wheels including:
  - a third guiding wheel which rotates about a third axis, said third guiding wheel including a third circular surface to engage the outer surface of the buffer tube; and
  - a fourth guiding wheel which rotates about a fourth axis, said fourth guiding wheel including a fourth circular surface to engage the outer surface of the buffer tube, wherein the fourth axis is spaced from and parallel to the third axis;
- a second gap formed between said third and fourth circular surfaces; and
- a second biasing element applying a second biasing force causing said third circular surface to move toward said fourth circular surface, wherein said third circular surface can move in a direction away from said fourth circular surface against the second biasing force of said second biasing element when a force is applied to said third circular surface, so that the second gap may become larger, wherein at least one of said third and fourth guiding wheels is driven to rotate.

2. The buffer tube clencher according to claim 1, wherein said first biasing element includes a spring pulling or pushing said first circular surface toward said second circular surface.

3. The buffer tube clencher according to claim 1, wherein said first biasing element includes a chamber with a pneumatic or hydraulic actuated pressure or vacuum moving a first plunger to create the first biasing force.

4. The buffer tube clencher according to claim 1, wherein said first and second biasing elements act independently, such that said first circular surface can move in a direction away from said second circular surface while said third circular surface remains at a set distance from said fourth circular surface.

5. The buffer tube clencher according to claim 1, further comprising:

- a first coating formed on said second circular surface, wherein said first coating has a higher coefficient of friction as compared to a material forming said second guiding wheel; and
- a second coating formed on said fourth circular surface, wherein said second coating has a higher coefficient of friction as compared to a material forming said fourth guiding wheel.

6. The buffer tube clencher according to claim 5, wherein said first and second coatings include at least one of a diamond coating, rubber coating and a polymer coating.

7. The buffer tube clencher according to claim 1, wherein the third axis is parallel to the second axis.

8. The buffer tube clencher according to claim 1, further comprising:

- a motor;
- a first drive linkage connecting said motor to said at least one of said first and second guiding wheels which is driven to rotate; and
- a second drive linkage connecting said motor to said at least one of said third and fourth guiding wheels which is driven to rotate.

9. The buffer tube clencher according to claim 8, wherein said first drive linkage is a first chain or belt.

10. The buffer tube clencher according to claim 1, further comprising:

a first electronically controlled servo motor connected to said at least one of said first and second guiding wheels which is driven to rotate; and a second electronically controlled servo motor connected to said at least one of said third and fourth guiding wheels which is driven to rotate.

11. The buffer tube clencher according to claim 1, further comprising:

a third set of guiding wheels including:

a fifth guiding wheel which rotates about a fifth axis, said fifth guiding wheel including a fifth circular surface to engage the outer surface of the buffer tube; and a sixth guiding wheel which rotates about a sixth axis, said sixth guiding wheel including a sixth circular surface to engage the outer surface of the buffer tube, wherein the sixth axis is spaced from and parallel to the fifth axis;

a third gap formed between said fifth and sixth circular surfaces; and a third biasing element applying a third biasing force causing said fifth circular surface to move toward said sixth circular surface, wherein said fifth circular surface can move in a direction away from said sixth circular surface against the third biasing force of said third biasing element when a force is applied to said fifth circular surface, so that the third gap may become larger, wherein at least one of said fifth and sixth guiding wheels is driven to rotate.

12. The buffer tube clencher according to claim 11, wherein the fifth axis is parallel to the fourth axis.

13. The buffer tube clencher according to claim 1, further comprising:

a first holder; and a first opening formed in said first holder;

a first axle configured to support said first guiding wheel to rotate about the first axis, wherein said first axis passes through a center of said first axle wherein said first axle resides within said first opening, and wherein said first biasing element tends to move said first holder or said first axle, or both, so as to bias said first circular surface toward said second circular surface.

14. The buffer tube clencher according to claim 13, wherein said first opening is formed as a first slot and said first biasing element causes said first axle to reside near or at a first end of said first slot, and wherein a deflection of said first circular surface away from said second circular surface causes said first axle to move away from said first end of said first slot and toward a second, opposite end of said first slot.

15. A cable element manufacturing machine comprising:

one or more payoff reels for supplying one or more optical fibers;

an extruder for receiving the one or more optical fibers and for extruding a buffer tube around the one or more optical fibers to form a cable element;

a main capstan for pulling the cable element forward at an advancement speed;

a cooling section, downstream of said extruder, for cooling and contracting the buffer tube;

a collection reel, downstream of said cooling section, to take up the finished cable element; and a buffer tube clencher, between said extruder and at least a portion of said cooling section, for elongating the buffer tube, said buffer tube clencher being characterized by:

a first set of guiding wheels including:

a first guiding wheel which rotates about a first axis, said first guiding wheel including a first circular surface to engage an outer surface of the buffer tube; and a second guiding wheel which rotates about a second axis, said second guiding wheel including a second circular surface to engage the outer surface of the buffer tube, wherein the second axis is spaced from and parallel to the first axis;

a first gap formed between said first and second circular surfaces;

a first biasing element applying a first biasing force causing said first circular surface to move toward said second circular surface, wherein said first circular surface can move in a direction away from said second circular surface against the first biasing force of said first biasing element when a force is applied to said first circular surface, so that said first gap may become larger, wherein at least one of said first and second guiding wheels is driven to rotate;

a second set of guiding wheels including:

a third guiding wheel which rotates about a third axis, said third guiding wheel including a third circular surface to engage the outer surface of the buffer tube; and a fourth guiding wheel which rotates about a fourth axis, said fourth guiding wheel including a fourth circular surface to engage the outer surface of the buffer tube, wherein the fourth axis is spaced from and parallel to the third axis;

a second gap formed between said third and fourth circular surfaces; and a second biasing element applying a second biasing force causing said third circular surface to move toward said fourth circular surface, wherein said third circular surface can move in a direction away from said fourth circular surface against the second biasing force of said second biasing element when a force is applied to said third circular surface, so that said second gap may become larger, wherein at least one of said third and fourth guiding wheels is driven to rotate.

16. The cable element manufacturing machine according to claim 15, wherein the rotation speed employed within said buffer tube clencher results in the buffer tube being moved forward faster than the advancement speed of the cable element set by said main capstan, which elongates the buffer tube relative to the one or more optical fibers therein.

17. The cable element manufacturing machine according to claim 15, wherein said cooling section includes a trough with water therein, and wherein said cooling section contracts the buffer tube relative to the one or more optical fibers therein.

18. A method of forming a cable element comprising:

supplying one or more optical fibers from one or more payoff reels to an extruder;

extruding a buffer tube around the one or more optical fibers to form a cable element;

advancing the cable element at an advancement speed using a main capstan;

cooling the cable element in a cooling section;

elongating the buffer tube after the extruding of the buffer tube and before finishing of the cooling of the buffer tube; and collecting the cooled cable element on a collection reel, characterized by the elongating of the buffer tube including:

guiding the buffer tube through a first gap between first and second guiding wheels, while allowing the first guiding wheel to move away from the second guiding wheel against a first biasing force;

driving a rotation of at least one of said first and second guiding wheels;

guiding the buffer tube through a second gap between third and fourth guiding wheels, while allowing the third guiding wheel to move away from the fourth guiding wheel against a second biasing force; and driving a rotation of at least one of said third and fourth guiding wheels.

19. The method according to claim 18, wherein a rotation speed employed during said elongating of the buffer tube results in the buffer tube being moved forward faster than an advancement speed of the cable element by the main capstan, which results in elongating the buffer tube relative to the one or more optical fibers therein.

20. The method according to claim 18, wherein cooling the cable element in the cooling section includes passing the cable element through a trough with water therein, and contracting the buffer tube relative to the one or more optical fibers therein.

21. A capstan system for controlling shrinkage of a buffer tube that surrounds one or more optical fibers as the buffer tube cools following extrusion of the buffer tube, the system comprising:

at least two capstans, each capstan including two opposing wheels engaging the buffer tube in a first plane, wherein each capstan incudes at least one driven wheel and wherein the clamping pressure exerted by each capstan on the buffer tube is monitored by at least one pressure sensor.

22. The capstan system of claim 21, wherein all of the wheels are driven in order to minimize resistance.

23. The capstan system of claim 22, wherein the wheels are all driven at the same speed.

24. The capstan system of claim 21, wherein the at least one pressure sensor includes a strain gauge.

25. The capstan system of claim 21, further comprising a clamping pressure adjustment system.

26. The capstan system of claim 25, wherein the clamping pressure adjustment system includes a pneumatic actuator.

27. The capstan system of claim 21, comprising two or more capstans in the first plane and two or more capstans in a second plane perpendicular to the first plane.

28. A method of controlling the post-extrusion linear shrinkage of a buffer tube surrounding one or more optical fibers, comprising:

driving the buffer tube separately form the one or more optical fibers at a speed greater than that of the one or more optical fibers, and controlling the relative speed of the buffer tube relative to the one or more optical fibers to maintain a defined difference in length of the buffer tube relative to the one or more optical fibers, wherein the driving of the buffer tube includes engaging the buffer tube with at least two capstans that clamp the buffer tube in a first plane, each capstan comprising two opposing wheels that engage and drive the buffer tube.

29. The method of claim 28, wherein the difference in length is an increase in length of the buffer tube relative to the one or more optical fibers and is maintained substantially at between 1% and 5% of the length of the one or more optical fibers.

30. The method of claim 29, wherein the increase in length of the buffer tube relative to the one or more optical fibers is maintained substantially at 3% of the length of the one or more optical fibers.

31. The method of claim 28, wherein the driving of the buffer tube comprises engaging the buffer tube with at least two capstans that clamp the buffer tube in a first plane, and at least two capstans that clamp the buffer tube in a second plane perpendicular to the first plane.

32. The method of claim 28, wherein the capstans wheels are all driven at the same speed.

33. The method of claim 28, wherein the gross linear speed of the buffer tube is adjusted by changing a size of the capstan wheels or changing the rotational speed of the capstan wheels.

34. The method of claim 28, wherein the fine excess linear speed of the buffer tube relative to the linear speed of the one or more optical fibers is adjusted by changing the pressure exerted on the buffer tube by the capstans.

35. The method of 33, wherein controlling of the length of the buffer tube relative to the one or more optical fibers includes monitoring the length difference between the buffer tube and the one or more optical fibers and adjusting the pressure exerted on the buffer tube by the capstans.

36. The method of claim 35, further comprising monitoring the pressure exerted by the capstans on the buffer tube.

37. The method of claim 36, wherein the monitoring of the pressure of the capstans on the buffer tube includes sensing the back pressure exerted by the capstans that are driving the buffer tube, by means of one or more pressure sensors.

38. The method of claim 35, further comprising adjusting the pressure of the capstans on the buffer tube by means of one or more pneumatic actuators that exerts pressure on at least one of the wheels of each capstan.

* * * * *